United States Patent [19]

Sauber

[11] Patent Number: 4,923,103

[45] Date of Patent: May 8, 1990

[54] LADDER RACK

[76] Inventor: Charles J. Sauber, 10 N. Sauber Rd., Virgil, Ill. 60182

[21] Appl. No.: 373,249

[22] Filed: Jun. 29, 1989

[51] Int. Cl.$^5$ .............................................. B60R 9/00
[52] U.S. Cl. .......................... 224/42.45 R; 224/42.43; 248/316.1
[58] Field of Search ................. 224/42.45 R, 42.46 R, 224/309, 310, 321–325, 42.38, 42.42, 42.43, 273, 329; 248/316.1, 316.5, 316.6; 211/60.1

[56] References Cited

U.S. PATENT DOCUMENTS

| | | | |
|---|---|---|---|
| 1,890,940 | 12/1932 | Fox | 224/42.43 |
| 2,080,527 | 5/1937 | Bixel | 224/42.43 |
| 4,170,331 | 10/1979 | Faulstich | 224/324 |
| 4,339,064 | 7/1982 | Ziiaylek, Jr. | 224/324 |
| 4,390,117 | 6/1983 | Fagan | 224/324 |
| 4,413,801 | 11/1983 | Lancaster et al. | 224/42.45 R |
| 4,827,742 | 5/1989 | McDonald | 224/323 |

Primary Examiner—Henry J. Recla
Assistant Examiner—Keith Kupferschmid
Attorney, Agent, or Firm—Leydig, Voit & Mayer

[57] ABSTRACT

A ladder rack device is provided for mounting to vertical structures such as vehicle bodies and includes a first support for receiving a first end of a ladder, the first support having a U-shaped bracket with vertical unaligned and offset spaced apart arms, a lower first shelf interconnects the arms and an upper flange transversely extends partially between the spaced arms leaving a top opening, the first shelf provides a floating slide surface for allowing a lower ladder rail to slide in the support upon loading and then exerts a retaining force upon an upper and lower rail of the loaded ladder, thereby securing said first end, and a second support distally spaced from the first support receives a second end of a ladder, the second support having a second shelf for supporting the weight of the ladder and a pivotal latching mechanism for engaging a rung of the ladder secures the ladder in a loaded position.

14 Claims, 3 Drawing Sheets

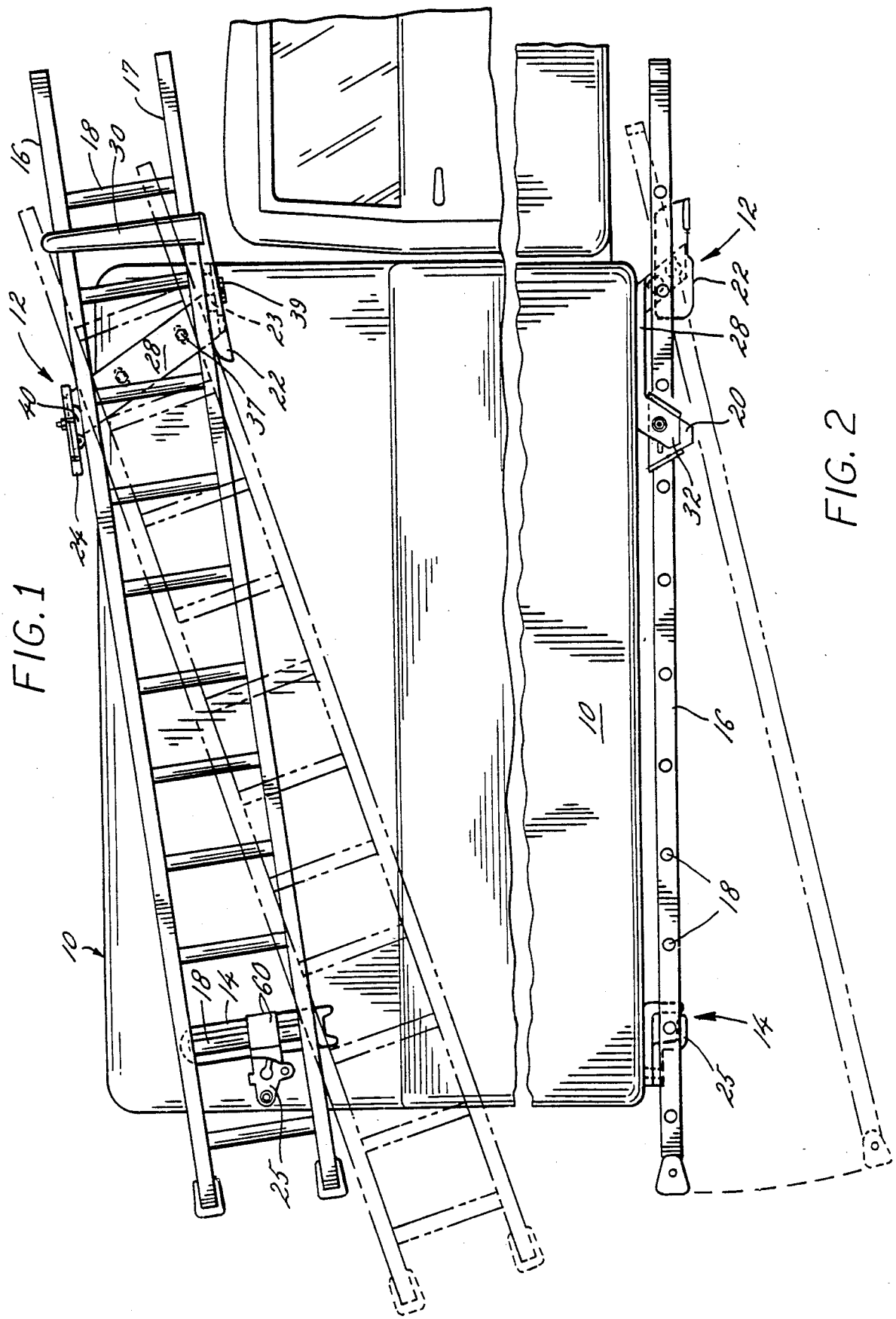

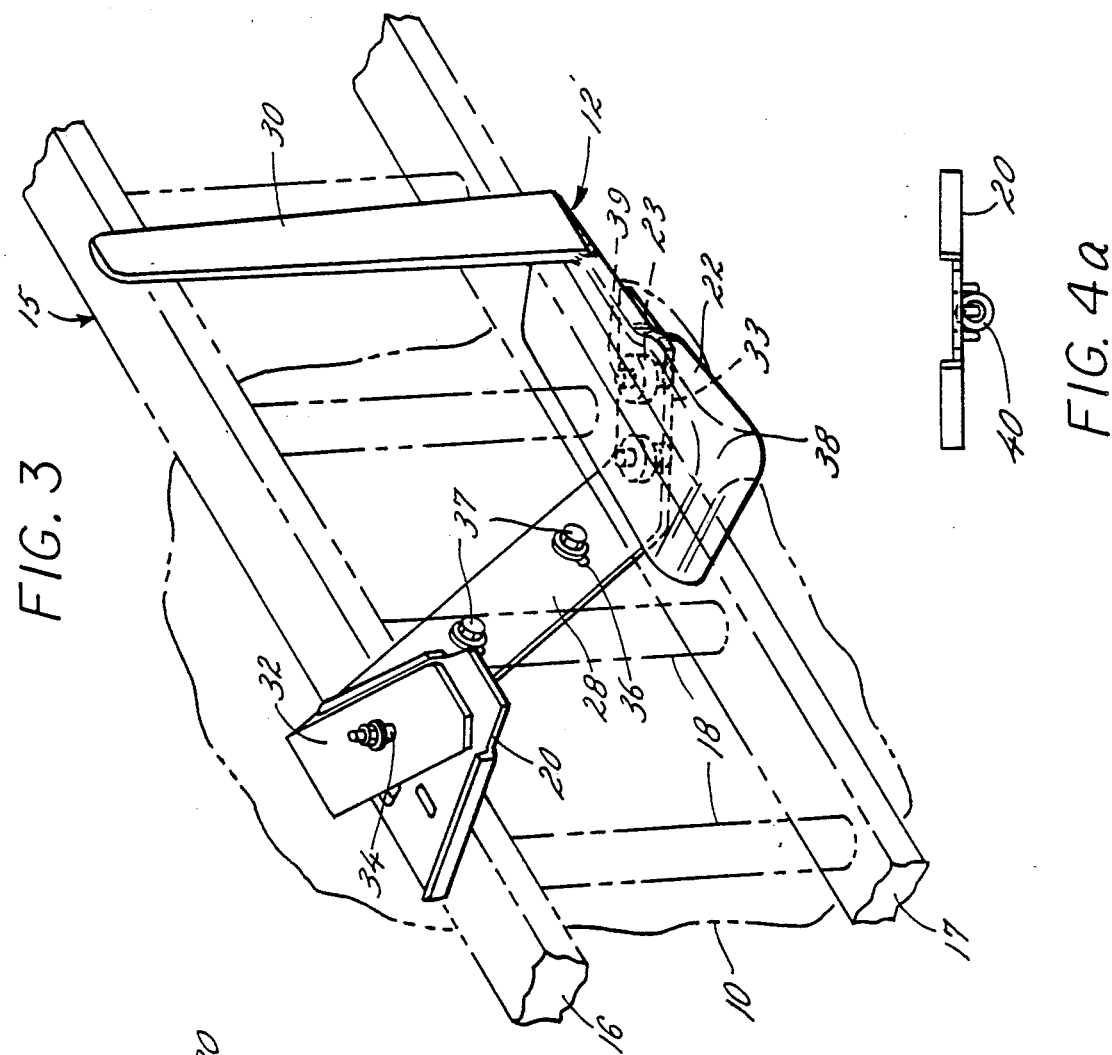
FIG. 3
FIG. 4a
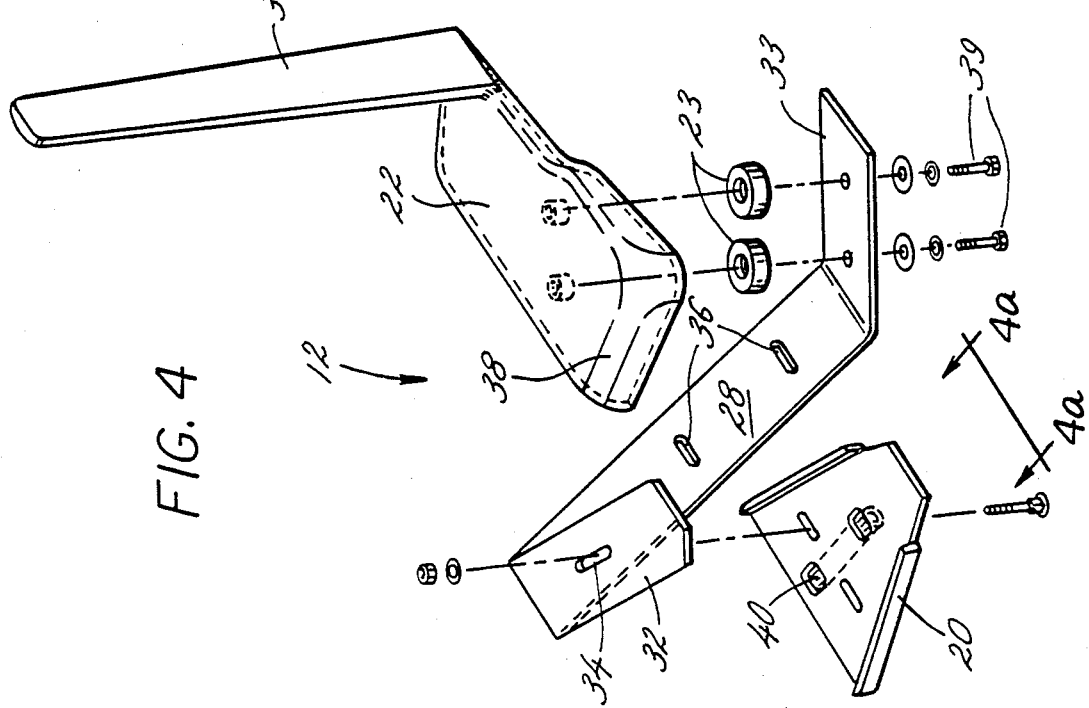
FIG. 4

LADDER RACK

FIELD OF THE INVENTION

The present invention relates generally to vehicle type ladder mounting devices, and particularly, to an improved ladder rack which securely retains a ladder in a mounting position without requiring additional tie-down devices, as well as providing a ladder rack which is easily loaded by one person without need for additional assistance.

BACKGROUND OF THE INVENTION

It has long been a common practice, such as with many commercial vehicles, for carriers or racks to be mounted on a rooftop or on the side to support a ladder. As these ladder rack devices are typically mounted significantly above ground level, considerable effort must be expended in order to raise sizeable ladders into a position for mounting. Furthermore, as it is not uncommon for commercial vehicles to be individually staffed, operators frequently encounter an increased burden of mounting a long or heavy ladder alone. Additionally, in order to secure the ladder to a typical mounting structure for hauling, the use of standard tie-downs or strapping devices is required. And, as standard mounting devices are typically constructed of metal, the ladders experience considerable vibrational wear during transport. There has been a clear need for a ladder rack that will not only retain the ladder in a non-vibrating, secured position when the vehicle is moving, without the need for additional tying or strapping devices, but a ladder rack that will also allow an individual operator, even a person who is not relatively strong or of large stature and physique to load a heavy ladder without considerable effort and without need of additional assistance.

OBJECTS AND SUMMARY OF THE INVENTION

It is a primary object of the present invention to provide a simple ladder rack assembly that solves previous long standing problems of use and which is easily loaded by one person without assistance.

It is another object of the present invention to provide a ladder rack of the foregoing type which securely retains a ladder in a non-binding mounted position without the need for additional tying or strapping devices.

It is still another object of the present invention is to provide a ladder rack which does not subject the ladder to considerable wear due to vibration and side-to-side movement and holds the ladder relatively quiet during transport.

It is yet another object of the present invention to provide a ladder rack of a simple, convenient and reliable construction which is economical to manufacture and use.

In general, the present invention contemplates a ladder rack having a first and second support adapted to be mounted in a spaced apart fashion on a vehicle body and which cooperatively permit loading using the principle of leverage that enables one person use and then to properly retain a ladder in a fixed hauling position. The first support is provided with a floating slide shelf which provides a comfortable surface for the ladder rail to slide over when loading or unloading and also helps to provide a retaining force upon the rails of a first end of a loaded ladder that prevents motion of the ladder in all directions. The second support is provided with a shelf for supporting the weight of a second end of the ladder, and it is further provided with a latching device and a retaining tab which cooperatively prevent the ladder from moving in either a longitudinal or transverse direction.

BRIEF DESCRIPTION OF THE DRAWINGS

For the purpose of facilitating an understanding of the invention, the accompanying drawings illustrate a preferred embodiment. The above and other objects of the invention, as well as the features thereof as summarized, will become more apparent from the following detailed description when taken in conjunction with the accompanying drawings:

FIG. 1 is a fragmentary side view of a vehicle including a body having the present ladder rack invention mounted on the body and showing a ladder in a mounted position, utilizing phantom lines to illustrate a mounting stage of the ladder;

FIG. 2 is a top view of the ladder rack invention as shown in FIG. 1;

FIG. 3 is an enlarged perspective view of the first support of the present ladder rack invention showing a ladder mounted therein;

FIG. 4 is an exploded view of the first support of the present ladder rack invention as shown in FIG. 3;

FIG. 4a is a side elevation view of the upper bumper device;

DETAILED DESCRIPTION OF THE PREFERRED EMBODIMENT

Figure 5:
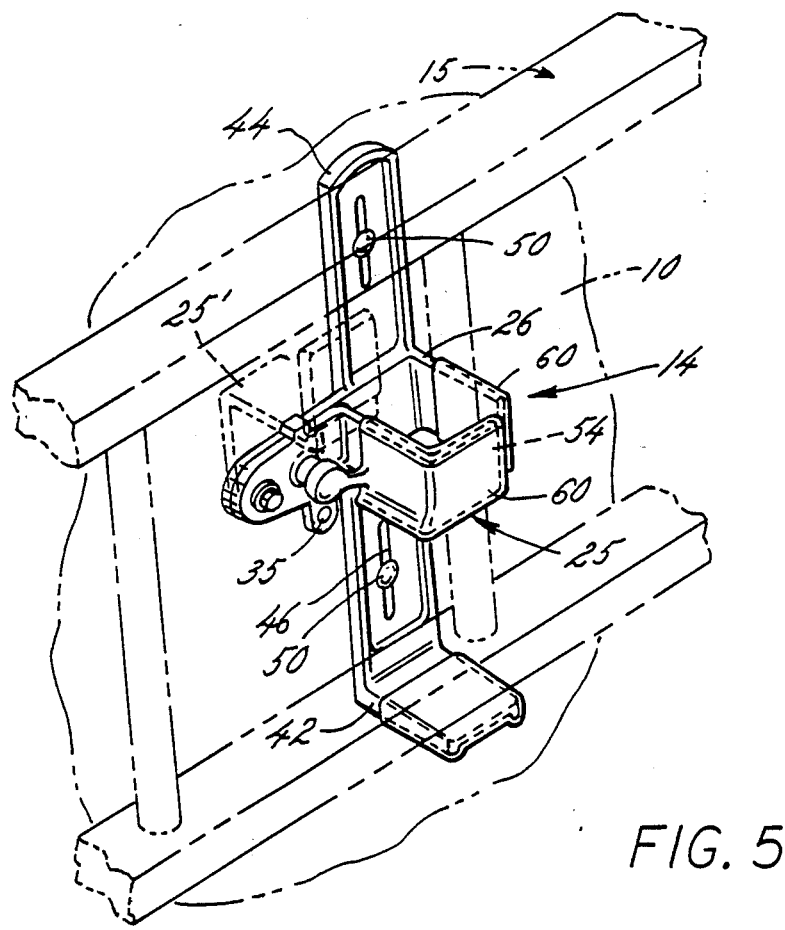
FIG. 5 is an enlarged perspective view of the second support of the present ladder rack invention showing a ladder mounted therein.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention as defined by the appended claims.

Turning now to the drawings, and first to FIG. 1, there is shown a vehicle body generally indicated at 10 having a side wall mounted ladder rack device which includes first and second spaced apart supports, 12 and 14 respectively, in which a ladder 15 is mounted. It should be appreciated that the rack of the present invention can be mounted on practically any vertical structure, and it is particularly well suited for vehicle bodies with superstructures such as what are referred to as cube vans and walk-in type truck bodies.

The ladder 15 shown in the drawings is illustrated here as one section which has rails 16, 17 and spaced rungs 18 interconnecting the rails. Such ladders may be made of wood, metal or fiberglass and more sections may be included together such as in the case of extension type ladders.

As discussed more fully below, ladder 15 which has been loaded onto the ladder rack is positioned such as shown in full lines in FIG. 1 with one end here being the forward end of the ladder being held in the first support 12, and the rearward end of the ladder is held by the spaced apart, body wall mounted second support 14. Attached to first support 12 are an upper bumper device 20 and a lower floating slide shelf 22 which cooperate to provide a retaining force upon the rails 16 and 17 of the loaded ladder 15. The second support 14 is provided with a latching device 25 which extends over a rung 18 of ladder 15, thereby securing the ladder in a mounting position.

In order to load the ladder 15 into the ladder rack, a first end of the ladder is placed such as by leaning the ladder on floating slide shelf 22 of the first support 12, such positioning best shown by the phantom lines in FIG. 1. A second end of the ladder is then raised in alignment with second support 14, and the ladder is pivoted laterally into a mounting position, the pivoting motion described by the phantom lines of FIG. 2. The ladder is then positioned such that rail 17 rests upon a shelf, cooperating with floating slide shelf 22 of first support 12 so as to support the weight of the ladder. As best disclosed in FIG. 5, the ladder is horizontally positioned such that a rung 18 is between latching device 25 and a retaining tab 26 of the second support 14. Accordingly, when in a closed position, the latching device 25 extends over rung 18, and cooperating with retaining tab 26, serves to prevent both horizontal and transverse movement of the ladder during transport.

In keeping with the invention as shown by reference to FIGS. 3 and 4, conjointly, the first support 12 is a two part L-shaped bracket arrangement which is assembled to form a U-shaped structure with unaligned and offset upright arms 28, 30. The wall mountable arm 28 is provided with upper and lower flanges, 32 and 33 respectively, such flanges extending transversely from the arm member 28. These extending flanges provide horizontal surfaces upon which the weight of the ladder is supported. In this preferred embodiment, the flanges extend transversely, as shown in FIG. 3, to a distance sufficient so as to support a single ladder. It should be appreciated, however, that the distance to which the flanges extend is only a design parameter, a parameter which may be varied so as to accommodate ladders having a greater overall depth than a single extension ladder. Furthermore, it should be appreciated that the flanges are spaced apart such a distance so as to allow for the mounting of a standard width ladder therebetween. Similarly, arm 30 has a lower end flange defining slide shelf 22 for ladder rail 17.

As shown in FIG. 3, bumper device 20 and floating shelf 22 are threadedly mounted upon respective flanges 32 and 33, occupying any gap which may exist between the flanges and the ladder rails, thereby providing a secure retaining force upon the loaded ladder. The arm 28 of first support 12 has been provided with mounting slots 36 through which threaded fasteners 37 extend for mounting the support arm to the vehicle body. The slots 36 further provide a means by which the mounting bracket may be angularly adjusted, such adjustment to be made by the operator to accommodate different ladder widths and further to provide ease of loading without assistance, a primary object of the present invention.

In furtherance of the invention, as previously discussed, the first support 12 has been provided with a lower floating shelf to conform with the rail 17 surface and allow it to be slid in the first support. The end edge 38 of shelf 22 is rounded to assist in sliding the ladder and avoids scrapping of the ladder rail 17. It will also provide a retaining force upon the upper and lower rails, 16 and 17 of the loaded ladder. As a feature of the present invention is to provide a ladder rack which does not subject the ladder to considerable wear during transport, it should further be appreciated that floating slide shelf should be coated with a low frictional material such as an epoxy paint or the like surface. In a preferred embodiment of the present invention, resilient material bushings 23 such as rubber are utilized inbetween the fasteners 39 to produce this highly desirable floating effect. Such material provides a cushioned support to absorb transmitted shock during transport, and further allows the ladder rail/floating shelf to conform when the ladder is loaded.

As disclosed in FIG. 3, bumper device 20 includes a resilient insert 40 which protects the ladder against damage or wear and provides a retaining force upon the upper rail 16 of the ladder. The insert is a piece of tubing constructed of a resilient, non-abrasive material. As the insert is of a smaller surface area, and contacts the ladder rail 16 with its radial surface, it is depressible, and deformible, by a smaller force. Accordingly, upon insertion of the ladder into the rack, the extending insert 40 is deformed in such a fashion so as to provide a compression force upon the ladder rail 16 thereby retaining the ladder in a fixed position. The bumper device may be constructed utilizing the invention disclosed and claimed in Charles J. Sauber U.S. Pat. No. 4,768,745 issued Sept. 6, 1988 entitled "Resililent Bumper Assembly".

In further keeping with the invention, floating slide shelf 22 provides a horizontal surface for holding the ladder and together with vertical arm 30 prevents transverse movement of the ladder during transport, so that the ladder is securely held against side-to-side movement. As shown in this preferred embodiment, vertical arm 30 is of sufficient length so as to span the distance between the ladder rails 16 and 17, such distance equivalent to the width dimension of the ladder. Accordingly, arm 30 provides a retaining force upon the ladder rails when the ladder is in a loaded position. It should be appreciated that in a preferred embodiment, extending arm 30 can be designed so as to serve primarily as a safety feature, that is, the arm 30 can be of such configuration that it does not contact the rails directly, rather serving only as a guard to prevent the ladder from falling from the vehicle, in a transverse direction, should it disengage from the ladder rack support 12 during transport. However, it should be further appreciated that vertical arm 30 may be designed so as to provide a direct retaining force upon the ladder when the ladder is placed in a loaded, hauling position. In particular, the floating slide shelf 22 may be angled about axis defining a vertical plane such that ladder rails 16 and 17 are contacted by vertical arm 30 when the ladder 15 is in a position to be loaded, such position shown by the phantom lines in FIG. 2. Accordingly, upon pivoting the ladder into its raised and loaded position, such pivoting described by the phantom lines of FIG. 2, ladder rails 16 and 17 are compressed against and retained by vertical arm 30. Thus, upon engaging the latching device 25, of the second support 14, the ladder is held in a compression state. Utilization of such compressive forces ensure that the ladder will not vibrate during transport, thereby ensuring no vibrational wear of the ladder as a result of the ladder rack. Furthermore, by eliminating vibration of the ladder during transport, increased vehicle noise is avoided.

Figure 6:
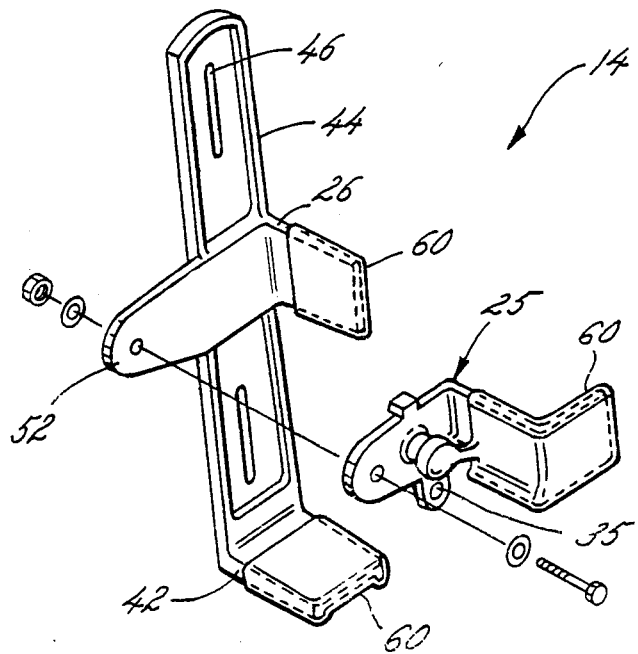
FIG. 6 is an exploded view of the second support of the present ladder rack invention as shown in FIG. 5.

In keeping with the invention, a second support 14 is provided, such support being mounted distally spaced from the first support 12, and cooperating therewith so as to support the weight of the ladder. As best shown in FIG. 6, second support 14 is provided with the latching means 25 for engaging rung 18 of the ladder, thereby retaining the ladder in its loaded position. Second support 14 is provided with a second shelf flange 42 which extends transversely from the bottom end of a mounting bracket 44. The shelf 42 extends to a predetermined distance, such distance being sufficient so as to support a ladder of standard width. It should be appreciated that this extension distance is merely a design parameter, a parameter which may be varied to accommodate ladders of varying widths.

In carrying out the invention, the second support 14 is further provided with a retaining tab 26 which extends transversely from the mounting bracket 44 for retaining the ladder in a fixed longitudinal position. In the event of a sudden starting or stopping of the vehicle, the retaining tab 26 contacts rung 18 of the ladder, thereby preventing the ladder from moving longitudinally and disengaging from the rack assembly. Mounting bracket 44 is further provided with a pair of mounting slots 46 through which fastening means 50 extend for attaching the second support 14 to the vehicle. The slots also provide a mechanism by which the second support 14 may be vertically adjusted, such adjustment being determined by factors such as the height of the operator.

In furtherance of the invention, mounting bracket 44 has been provided with latch extension tab 52 to which latching device 25 is pivotally connected. Latching device 25 incorporates an L-shape leg 54 which extends over the rung 18 of the ladder in proximate relation to extending tab 26, thereby preventing transverse movement of the ladder when the latch is in a closed position. It should be appreciated that extending leg 54 can be designed so as to accommodate ladders of varying widths. To further insure that the latch remains in a closed position, corresponding apertures 55 and 56 have been provided in latching device 25 and latch extension 52 (respectively), thereby providing means for securing the latch 25. In order to guard against theft, the aperture size can be formed of such dimension such that a standard locking device can be inserted 35 therethrough.

In further keeping with an object of the invention, various portions of the second support 14 that may contact ladders are covered or coated with a resilient, non-abrasive material 60. Incorporation of a covering or coating such as plastic or rubber insures that the ladder is not subjected to considerable wear during transport.

As briefly discussed herein, the ladder is initially placed such as by leaning one end against the shelf 22 within the open top of the arms of first support 12, and then by a sliding and raising of the other end of the ladder, it can be pivoted in position to be secured in second support 14 for hauling. In order to position the ladder in second support 14, the latching device 25' is initially placed in its upright open position, such position depicted by the phantom lines of FIG. 5. After positioning the rung and ladder in its proper position, that is after placing the ladder upon the rearward shelf 42 such that the rung 18 is disposed in a plane parallel to the plane described by mounting bracket 44, the latch 25 is then pivoted to its closed position. Accordingly, the leg 54 extends over rung 18, thereby securing the ladder in its hauling position.

I claim as my invention:

1. A ladder rack device for mounting on a vertical wall such as a vehicle body or the like comprising, in combination:

a first wall mountable support for receiving a first end of a ladder, said first support including a generally U-shaped bracket means for securing said ladder in a mounting position; said first support bracket means including a first horizontal shelf means and a pair of upright arms each having one end connected to said first shelf means and extending normally and upwardly therefrom for supporting the ladder therebetween, one of said pair of arms being mountable on said vertical wall and being angled with respect to said first shelf, said one arm further including an upper flange at an opposite end thereof parallel to said first horizontal shelf and spaced therefrom such that the sides of a ladder would fit parallel to and snugly between said upper flange and said first shelf;

a second support adapted to be wall mounted distally spaced from said first support for receiving a second end of said ladder, said second support having bracket means and a second horizontal shelf for supporting the ladder, said one arm being angled toward said second support, and said second support bracket means carrying latching means for engaging a rung of said ladder whereby said ladder is retained in a loaded position on said first and second support shelves and is removed therefrom by unlatching said latching means and pivoting said ladder downwardly about said first horizontal shelf.

2. A ladder rack assembly as claimed in claim 1 wherein said first support mounting bracket is two parts, the first part comprising said one arm from which said upper flange and a lower flange transversely extend, said upper and lower flanges being spaced apart so as to allow for the mounting of a ladder therebetween.

3. A ladder rack assembly as claimed in claim 2 wherein said one arm includes a plurality of mounting elongated slots through which fastening means may extend for attaching said first support to a mounting surface, said slots allowing for angular adjustment of said mounting bracket on said wall.

4. A ladder rack as claimed in claim 2 wherein said upper and lower flanges include at least one aperture through which fastening means extend for mounting a bumper means and said first horizontal shelf means on said upper and lower flanges, respectively, for holding said ladder.

5. A ladder rack as claimed in claim 2 wherein said upper flange and lower flange include an upper bumper and said first horizontal shelf respectively, said bumper and said first shelf cooperatively arranged so as to contact and provide a retaining force upon an upper and lower rail of said ladder.

6. A ladder rack as claimed in claim 5 wherein said upper bumper mounted upon the upper transverse flange of said first support includes a resilient insert for providing a retaining force upon said upper rail of said ladder.

7. A ladder rack as claimed in claim 5 wherein said first horizontal shelf is mounted on the lower transverse flange of said first support, other arm of said pair of arms retaining said ladder against transverse movement and said first horizontal shelf being the lower surface on which said lower rail of said ladder is retained.

8. A ladder rack as claimed in claim 5 wherein said upper bumper and said first horizontal shelf include resilient rubbery material means.

9. A ladder rack as claimed in claim 1 wherein said first horizontal shelf means provides a floating slide surface so as to contact and provide a guide over which a lower rail of said ladder is moved for loading.

10. A ladder rack as claimed in claim 1 wherein said second support mounting bracket includes a retaining tab extending transversely therefrom for retaining said ladder in fixed longitudinal position, said second horizontal shelf extending transversely from an end of said bracket for supporting a rail of said ladder and retaining said ladder in fixed vertical position, and a latch extension for mounting a latching device thereupon.

11. A ladder rack as claimed in claim 10 wherein said latching device is pivotably connected to said latch extension of said mounting bracket, and has a substantially L-shaped leg, said leg extending to a position proximate said retaining tab for preventing transverse movement of said ladder when said latch is in a closed position.

12. A ladder rack as claimed in claim 11 wherein said substantially L-shaped leg extends over a rung of said ladder when in a closed position.

13. A ladder rack assembly as claimed in claim 10 wherein said second support means is provided with means for securing said latching device in a closed position.

14. A ladder rack assembly as claimed in claim 10 wherein said second support mounting bracket includes a plurality of elongated mounting slots through which fastening means extend for attaching said second support to the mounting wall surface, said slots allowing for vertical adjustment of said mounting bracket.

* * * * *